No. 766,847. PATENTED AUG. 9, 1904.
D. T. SHARPLES.
TEAT CUP.
APPLICATION FILED JAN. 21, 1903.
NO MODEL.
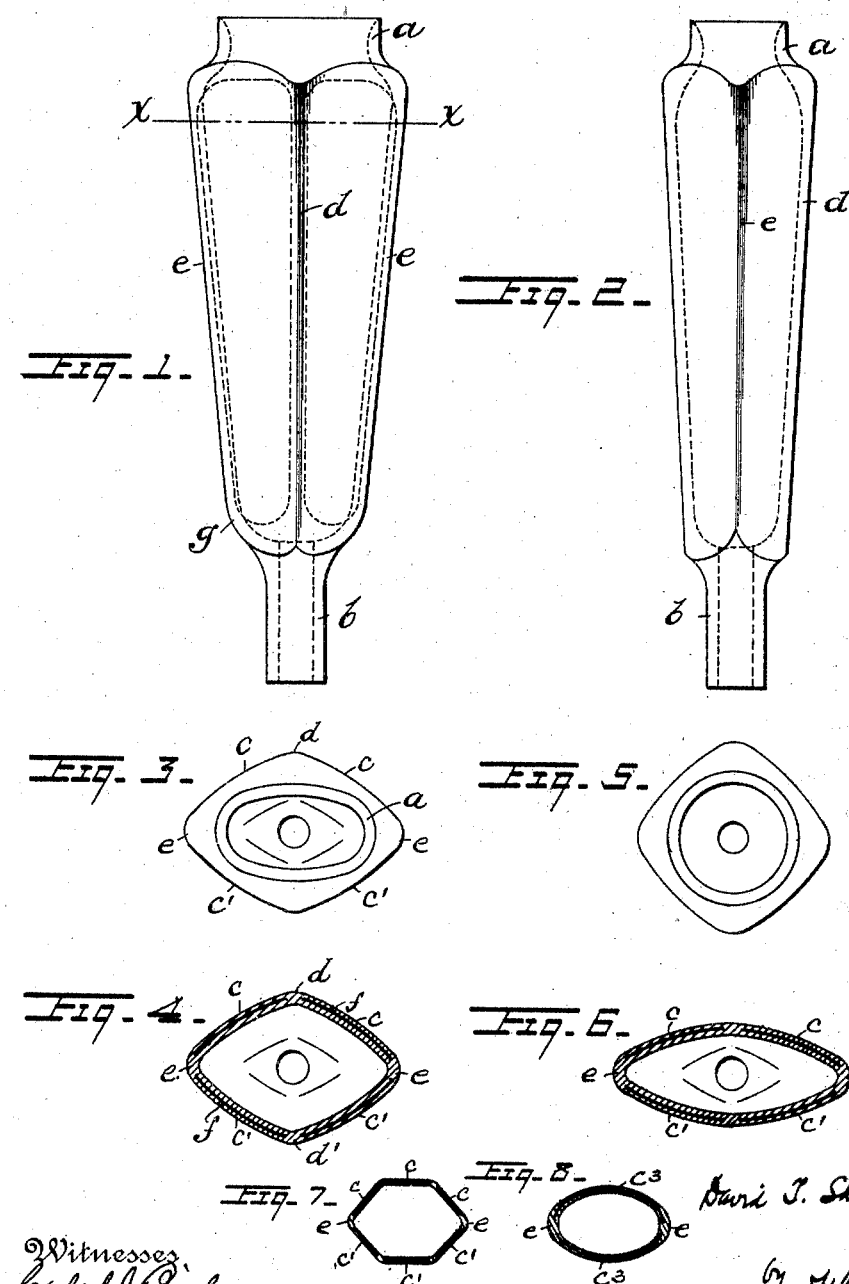

No. 766,847. Patented August 9, 1904.

UNITED STATES PATENT OFFICE.

DAVID TOWNSEND SHARPLES, OF WESTCHESTER, PENNSYLVANIA.

TEAT-CUP.

SPECIFICATION forming part of Letters Patent No. 766,847, dated August 9, 1904.

Application filed January 21, 1903. Serial No. 139,913. (No model.)

*To all whom it may concern:*

Be it known that I, DAVID TOWNSEND SHARPLES, a citizen of the United States, residing in Westchester, in the county of Chester, State of Pennsylvania, have invented certain new and useful Improvements in Teat-Cups, of which the following is a specification.

My invention relates to teat-cups employed in milking cows, and more particularly to the type of teat-cup described and claimed in my pending application, Serial No. 113,906, filed July 1, 1902, the characteristic features of which are the oblong cross-sectional form of the body and the rigid construction of opposite wall portions thereof, whereby external pressure upon the whole surface of said rigid wall portions tends to close the same together toward the mouth portion of the cup, so as to effectively manipulate the inclosed teat.

My present improvements are fully described in connection with the accompanying drawings, and the novel features are specifically pointed out in the claims.

Figure 1 shows in elevation a teat-cup embodying my improvements. Fig. 2 is an elevation taken at right angles to that of Fig. 1. Fig. 3 is a top view of the cup, showing the normal shape of the mouth portion thereof. Fig. 4 is a cross-sectional view of the body of the cup, taken on the line $x\ x$ of Fig. 1. Fig. 5 is a top view of the cup similar to Fig. 3, but showing the same distorted from its normal shape preparatory to placing it upon a cow's teat. Fig. 6 is a cross-sectional view of the body of the cup corresponding to Fig. 4, but showing the change of form which results from external pressure upon the walls of the cup, the rigid wall portions being partially closed together upon the teat. Figs. 7 and 8 indicate modifications.

My improved teat-cup comprises, as usual, a mouth portion $a$, a connecting end $b$ for the conducting tube or conduit, and a main or body portion inclosing the teat below the mouth $a$. My improvements relate to the novel construction of the mouth and body portions. These teat-cups are commonly employed in connection with a vacuum system, whereby the air is exhausted from the cup when the latter is placed upon the teat. Inasmuch as this exhaustion begins as soon as the mouth of the cup is approximately closed by the teat, considerable difficulty is experienced in properly applying the cups, because of the external pressure thereon due to such partial exhaustion of air within it tending to close the cup upon the teat before the latter has been fully entered in the cup, the mouth portion of which latter should grip the base of the teat adjacent to the udder in order to secure proper action upon the teat. In order to avoid this difficulty and also to provide a moderate grip upon the teat independent of any collapsing pressure upon the cup, I make the flexible mouth portion $a$ of the cup of normally oblong form, as indicated in Fig. 3, and provide in connection therewith a body portion the form of which can be distorted or changed from its normal shape by suitable pressure, so as to simultaneously change the form of the oblong mouth to approximately circular shape, thus enabling the operator to maintain the mouth of the cup in such approximately circular shape until it has been passed snugly home to the base of the teat, after which the distorting pressure is removed and the return of the cup to its normal shape causes it to grip the base of the teat sufficiently to materially assist at least in holding the cup upon the teat. This body portion of the cup is also made of normally oblong form in cross-section, Figs. 3 and 4, and is made up, as shown, of opposite rigid wall portions $c\ c$ and $c'\ c'$, respectively, each pair being flexibly united longitudinally at their meeting edges $d$ and $d'$, respectively, and also having its outer edges flexibly united longitudinally with the opposite pair at $e$ and $e$. These rigid wall portions $c\ c$ and $c'\ c'$ thus flexibly united form, as shown, a body of normally rhomboid cross-section, the acute angles of which at $e\ e$ lie in the major axial plane of the flexible oblong mouth portion $a$ of the cup, so that in order to change the form of said mouth to approximately circular the operator need merely press the body portion into more nearly "regular" shape, as indicated in Fig. 5, the flexibly-united edges readily permitting such distortion. While thus forcibly changed from its original or normal form into proper shape for conveniently entering the teat, the cup may be readily and leisurely moved to its proper position upon the latter, even though exhaustion of air from the cup occurs before such movement is completed, the external pressure upon the rigid walls of the cup being in the construction shown neutralized in all directions so long as the cup is converted into regular instead of oblong section. The opposite wall portions $c\ c$ and $c'\ c'$ though yieldingly united, as described, are of rigid construction, sheet-metal plates $f$ being preferably incorporated in the flexible material, as shown, in the process of manufacturing. These stiffening-plates preferably extend approximately the full length of the cup-body, so as to provide an external area the pressure upon which is cumulatively effective in collapsing the cup. Like the form of cup shown in my prior application referred to, these opposite rigid wall portions have what I term a "pivotal" or "bodily-closing-together" movement outward from a point $g$ of practically fixed spread adjacent to one end of the cup and are also preferably increased in area toward the mouth portion of the cup. In my present improved construction, however, the form of the cup-body may be changed either by increasing or decreasing the normal oblongness of the cross-section thereof, such increase occurring when the whole surface of the cup is subjected to a uniform collapsing pressure in the same manner as in my prior construction referred to, while the decrease is produced by the operator in order to facilitate the operation of applying the cup, as has been fully described.

The specific construction shown as embodying my improvements may evidently be modified without departing from the spirit of the invention. Thus in Fig. 7 the opposite rigid wall portions are formed of three instead of two flexibly-united sections $c\ c\ c$ and $c'\ c'\ c'$, respectively, while in Fig. 8 each of said wall portions is formed in a single section $c^3$, which is flexibly united at the edges $e\ e$ to the opposite wall portion, as before described, and the bend of which can be forcibly increased by pressure at said points $e\ e$, so as to temporarily reduce the oblongness of the cross-section, as in the previous construction indicated.

What I claim is—

1. A teat-cup having a normally oblong flexible-walled mouth portion.

2. A teat-cup having a normally oblong flexible-walled mouth portion and a distortable body portion whereby said oblong mouth may be pressed into approximately circular form.

3. A teat-cup having a normally oblong flexible-walled mouth portion and a distortable body portion with stiff sides also of normally oblong cross-section whereby said oblong mouth may be pressed into approximately circular form.

4. A teat-cup having a body of normally oblong cross-section with oppositely-arranged distortable wall portions and resilient connections between said portions, whereby the cross-sectional form may be temporarily flattened or rounded substantially as and for the purpose set forth.

5. A teat-cup having a body portion of rhomboid cross-section with flexibly-connected rigid sides.

6. A teat-cup having a body portion of rhomboid cross-section with flexibly-connected rigid sides of increased area toward the mouth end of the cup.

7. A teat-cup having a normally oblong flexible-walled mouth portion and a body portion of rhomboid cross-section with flexibly-connected rigid sides.

8. A teat-cup having a normally oblong flexible-walled mouth portion and a body portion of rhomboid cross-section with flexibly-connected rigid sides of increased area toward the mouth end of the cup.

In testimony whereof I affix my signature in the presence of two witnesses.

DAVID TOWNSEND SHARPLES.

Witnesses:
 MARY E. RUPERT,
 H. B. CARLISH.